Figure 1:
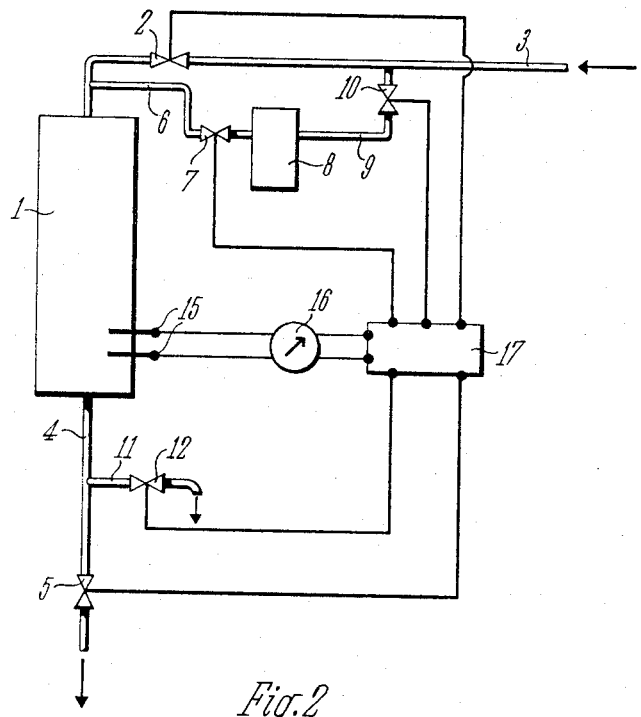

May 14, 1968

H. AMMER 3,383,310

METHOD OF AND APPARATUS FOR MEASURING THE HARDNESS
OF WATER AND FOR CONTROLLING OTHER
PROCESSES RELATED THERETO

Filed Aug. 29, 1963

3 Sheets-Sheet 1

INVENTOR

HEINZGERT AMMER

BY Dicke and Craig

ATTORNEYS

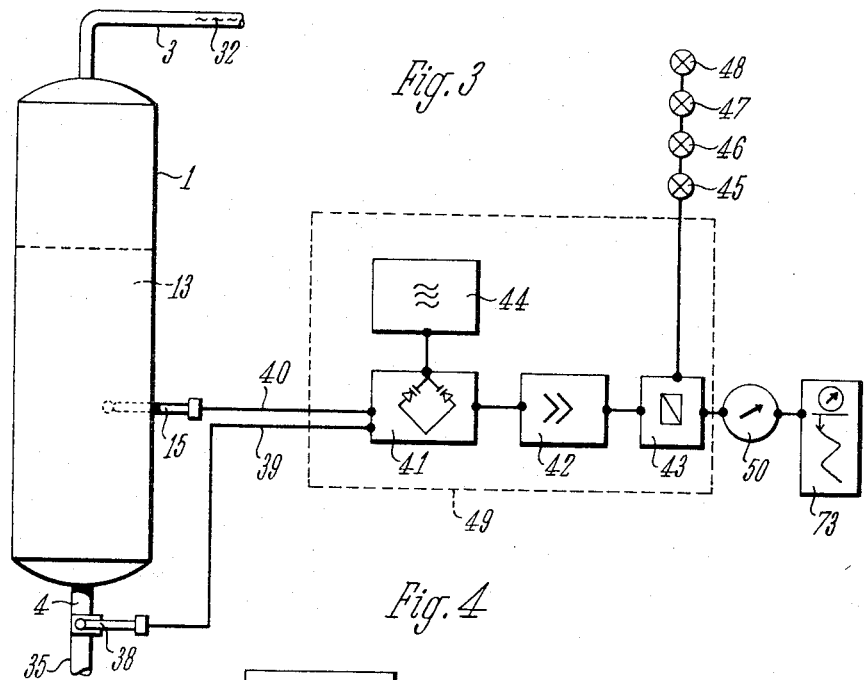
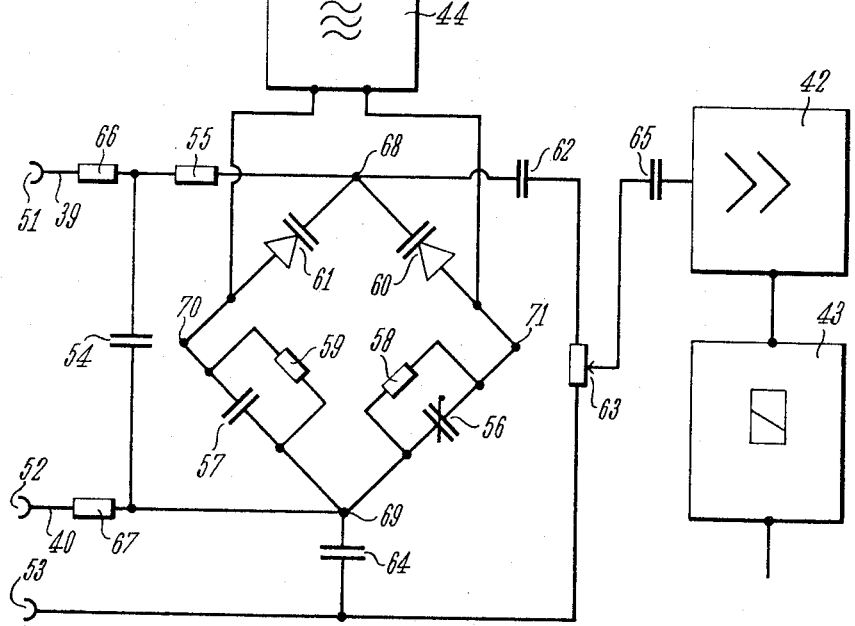

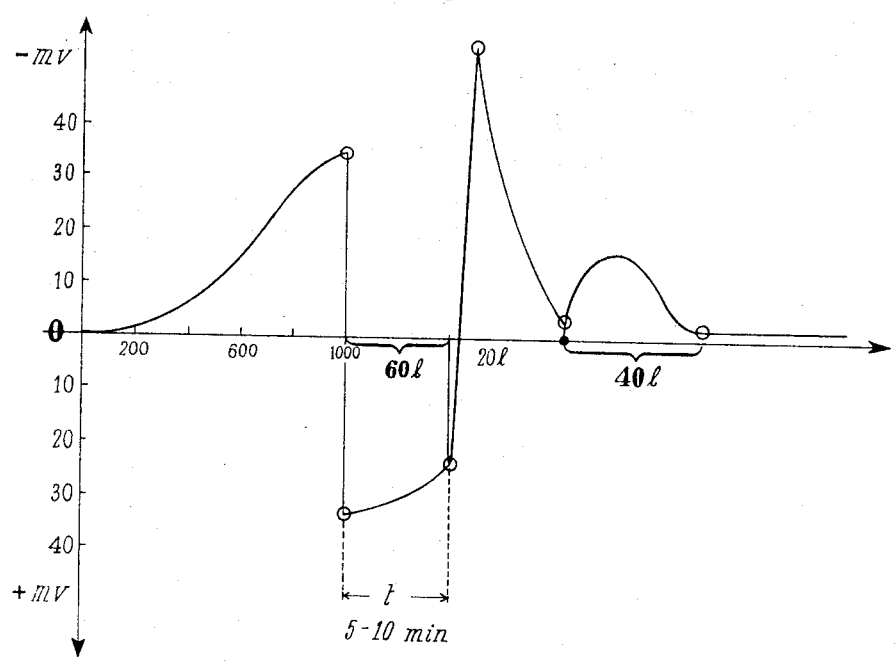

United States Patent Office 3,383,310
Patented May 14, 1968

3,383,310
METHOD OF AND APPARATUS FOR MEASURING THE HARDNESS OF WATER AND FOR CONTROLLING OTHER PROCESSES RELATED THERETO
Heinzgert Ammer, Guglingen, Germany, assignor to Dr. Gerhard Ammer, Guglingen, Germany
Filed Aug. 29, 1963, Ser. No. 305,338
Claims priority, application Germany, Sept. 5, 1962, A 41,082; Aug. 7, 1963, A 43,779
16 Claims. (Cl. 210—25)

The invention relates to a method of and an apparatus for measuring and controlling the hardness of water (magnesium and calcium hardness, or in some cases of other alkaline earth metals) in conjunction with an ion exchanger delivering alkali metal ions.

In order to remove the hardness of water by means of ion exchangers in general the water is passed through a container in which the ion exchange material is located. Sodium ions are bound to this ion exchange material.

The calcium and magnesium ions contained in the water and also iron and similar ions are absorbed by the ion exchange material which delivers an equivalent quantity of sodium ions. Whereas in the known methods the concentration of the magnesium and calcium ions was measured directly partly by titration and measurement of the color change or the like, the invention consists in measurement of the concentration of the liberated sodium ions, but not of the concentration of the ions causing the hardness. The invention has the particular advantage that it is possible to determine not only the hardness of the water but that additionally also the state of the ion exchange material can be controlled and that furthermore the regeneration process and the subsequent washing process can also be measured exactly and controlled by means of this measurement.

When the ion exchange material has delivered all sodium ions and has absorbed the equivalent quantity of magnesium and calcium ions the concentration of the sodium ions drops to the sodium content of the water under treatment. This measuring criterion can be utilised for initiating the regeneration of the ion exchange material. This regeneration is generally carried into effect by treating the ion exchange material with a solution of common salt whereby the calcium and magnesium ions are given up again by the ion exchange material and are replaced by sodium ions. The ion exchange material is then washed so that the excessive sodium ions which do not adhere to the ion exchange material are removed again. When all excessive sodium ions have been removed the ion exchange material is inserted again into the fresh water circuit and serves again for removing the hardness from the water.

If under certain circumstances the ion exchange material is washed with a fluid containing sodium ions under automatic control by a measuring instrument, an instrument which responds only to sodium ions indicates the constantly rising sodium ion concentration. In one embodiment of the invention when the instrument indicates a measuring value which corresponds to the sodium ion concentration used for regeneration, e.g. a 10% solution of common salt under certain circumstances a second control function is initiated which re-adjusts the valves of the apparatus so that washing water is passed through the ion exchange material. Consequently upon this step the measuring instrument indicates a sodium ion concentration which decreases with time. When then the sodium ion concentration indicates a value which is only slightly higher than that sodium ion concentration which is measured beyond the ion exchanger after insertion of the ion exchange material in the fresh or untreated water circuit, a further control function is initiated which changes over the valves of the apparatus so that the ion exchange material is inserted again in the fresh water circuit.

In contrast to the method just described one modification of the method according to the invention does not delay the regeneration of the ion exchange material until the sodium ion concentration beyond the ion exchange material has dropped substantially to zero, but the control is adjusted so that the ion exchange material is removed from the fresh water conduit and the regeneration is initiated already when the sodium ion concentration drops below a predetermined range within which, according to experience, the hardness of the water may fluctuate.

The method according to the invention is not tied to a particular apparatus. The sodium ion concentration may be determined in any possible manner, for example by flame photometry or by spectroscopic analysis, by known precipitation reactions, or in a particularly preferred embodiment of the invention, by potential measurement. This potential measurement may be carried into effect particularly advantageously by means of so-called glass electrodes relatively to a calomel electrode, glass electrodes with a high alkali deficiency being used.

The method according to the invention of determining the water hardness by measurement of the sodium ion concentration may be carried into effect completely independently of the way in which the regeneration of the ion exchange material occurs. The regeneration of the ion exchange material may even be controlled as already known, for instance by a time clock, which is adjusted to that period in which the regeneration is normally completed. Also the washing process may be controlled by a time switch which is adjusted to an empirical value. An embodiment of the invention is preferred in which as stated above the regeneration of the ion exchange material is controlled by the sodium ion concentration.

The invention is not limited merely to the removal of hardness from water. Rather the invention may be applied advantageously even to other ion exchange methods, always those ions being measured which are delivered by the ion exchange material. In all these cases the advantage is obtained that the regeneration of the ion exchange material can be controlled by the same measuring arrangement.

The invention relates further to an apparatus for carrying the method into effect. The potential measurements may be effected beyond the container in which the ion exchange material is disposed. In this case when the ion exchange material is exhausted hard water passes through the container and into the soft water circuit until the control arrangement has closed the circuit, changed over the container with the ion exchange material from the circuit and has initiated the regeneration process. If when the ion exchange material is exhausted the entry of water from which the hardness has not yet been removed must be prevented under any circumstances, the apparatus according to the invention can be constructed so that the potential measurement is effected approximately in the last third part of the container containing the ion exchange material seen in the direction of flow of the water current through the container.

Experience has shown that a container traversed in one direction the whole surface of the ion exchange material is not covered simultaneously and uniformly with exchanged ions, but that the boundary which separates the exhausted ion exchange material from the ion exchange material which is not yet exhausted, progresses in the direction of the water current. When the pair of measuring electrodes is arranged somewhere in the last third part of the container for the ion exchange material, exhausted ion exchange material is already measured there when layers of non-exhausted ion exchange material are still present at the rear end of the container. In this case water from which the hardness has been removed leaves the container as before; the regeneration process however can already be initiated in order to prevent the above mentioned boundary from advancing to the end of the container and thereby water from which the hardness has not been removed from entering the fresh water circuit through which only water is to flow from which the hardness has been removed.

When the above mentioned boundary between the exhausted and the non-exhausted ion exchanged material enters the region of the pair of electrodes, the measuring value changes and the operating processes which effect the regeneration of the ion exchange material are initiated and controlled by this change of the measuring value. The measuring value measured by the pair of electrodes however changes not only when the concentration of the ions to be measured changes, that is the boundary between the exhausted and the non-exhausted ion exchange material advances into the region of the pair of electrodes, but also for instance when a concentration of ions is changed which are not affected by the ion exchanged material. These effects upon the measuring value are more or less strong depending upon how successfully the electrode arrangement has been selected so that it responds selectively only to that ion kind the concentration of which is changed by the use of the ion exchanger. Ion concentrations modifying the measuring value can be caused for instance by apparatus preceding the ion exchanger, for the removal of acids and iron compounds by means of half-burned dolomite, calcium decarbonizing plants, hydrogen exchangers or the like. Furthermore changes in the sodium ion concentration are possible for instance due to pre-treatment with sodium phosphates, silicates or the like. It is therefore possible that in the case of such a pre-treatment, fluctuations of the pH value, the hardness and the sodium content occur simultaneously.

These effects can be eliminated, if necessary, by influencing the measuring value in dependence upon the concentration of ions which falsify the measuring value.

In one embodiment of the apparatus according to the invention the conductivity of the incoming water is measured for this purpose. Hardness fluctuations of the water result in fluctuations of the conductivity. These fluctuations of the conductivity of the incoming water serve for compensating the fluctuations of the indication which is produced by the fluctuating sodium ion concentration caused by the fluctuating water hardness. The measurement of the sodium ion concentration serves in this case merely for detecting the instant at which the ion exchange material is exhausted or tends to exhaustion, and for delivering a control signal which initiates the regeneration of the ion exchange material.

Obviously in this case in which the measurement serves only for initiating the regeneration of the ion exchange material in good time, other methods may also be employed in order to eliminate fluctuations of the hardness of the incoming water.

In a preferred embodiment of the invention a second pair of measuring electrodes is inserted in the soft water behind the ion exchanger and the difference between the measuring values of the two electrode pairs is utilized for controlling the washing and/or regeneration processes. Those components contained in the water which are not eliminated by the ion exchangers affect therefore the first and also the second electrode pair in the same manner so that these effects cancel each other, if merely the difference between the measuring values of the two electrode pairs is utilised for triggering a control signal.

The particular advantage of this embodiment lies therefore in the fact that fluctuations of the ion concentration of the incoming water can no longer influence the measuring result and in particular that the control signal for initiating the washing and regeneration processes of the ion exchanger, is triggered off always at that instant at which the ion exchange material is exhausted to a predetermined degree and extent.

This method in which the difference of two measuring values is utilized before the control can be applied independently of whether the first electrode pair measures the concentration of that kind of ion which is absorbed by the ion exchanger (e.g. calcium ions), or whether that kind of ion is measured which is delivered by the ion exchanger when it absorbs the ions causing the hardness of the water (e.g. sodium ions).

Finally this method has additionally the further advantage that it is no longer decisively important for the equality and accuracy of the method that the electrode arrangement is very strongly selectively responsive to the ion kind to be measured, that is an electrode pair does not have to be used which consists of a so-called alkali glass electrode and a calomel electrode and which is selectively sensitive to sodium ions. Rather in this method less selective electrode pairs and electrode arrangements may alternatively be used.

The difference of the measuring values detected by the electrode arrangements may be converted into a control signal for triggering the washing and/or regeneration processes of the ion exchanger by means of a variety of circuits. In one embodiment of an apparatus for carrying into effect the method according to the invention the two electrode arrangements are connected to a bridge circuit, the difference current of this bridge circuit serving for changing the resistance of at least one bridge arm. This embodiment of the invention may be developed further so that a high frequency generator is provided as current source for the bridge circuit and that capacitance diodes are inserted in the two bridge arms of one section of the bridge lying between the terminals of the high frequency generator, the resistance value of which diodes is changed by the difference current. The bridge output may be connected to a relay stage by way of an amplifier.

The invention is not limited only to the use at each measuring point of only two electrodes since more than two electrodes may alternatively be provided at one measuring place.

Further features of the invention result from the following description of one embodiment of the invention in conjunction with the claims and the accompanying drawings. The individual features however may be utilized either by themselves or in conjunction with others in one embodiment of the invention.

The drawing illustrates the parts, circuits and symbols necessary for understanding the invention.

Figure 2:
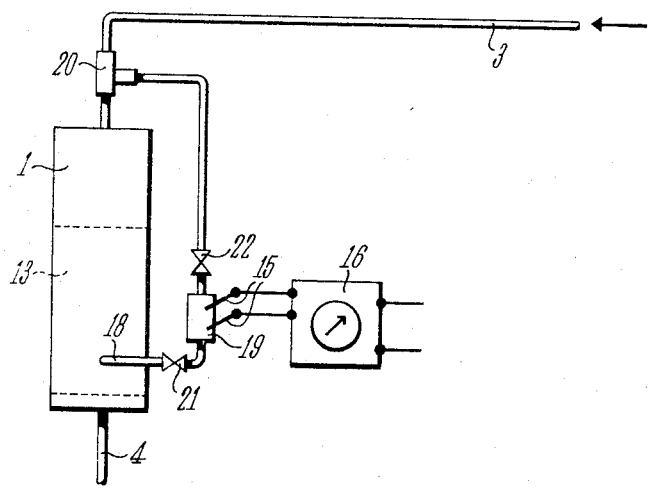

FIG. 1 illustrates diagrammatically one embodiment of the apparatus according to the invention, FIG. 2 illustrates one detail of another embodiment of the apparatus, FIG. 3 illustrates diagrammatically the essential parts of a third embodiment of an apparatus according to the invention, FIG. 4 illustrates part of the circuit of the apparatus according to FIG. 3 on an enlarged scale, FIG. 5 is a diagram in which the difference voltages of the two measuring electrode arrangements of the apparatus according to FIG. 4 in the various operating processes are plotted against the flow-through quantity of the various liquids.

A container 1 for ion exchange material is connectable to a crude or fresh water circuit 3 by way of a valve 2. The outlet of the container 1 is connected to a pipe network by means of a pipe 4 and a valve 5, to which network only soft water is to be supplied. A pipe 6 is connected to the crude water line 3 between the valve 2 and the inlet to the container 1 the pipe 6 leading through a valve 7 to a container 8 for the regenerating solution, e.g. a 10% solution of common salt. This container 8 is connected to the crude water pipe 3 by way of a pipe 9 and a valve 10. Furthermore a pipe 11 which leads to an outlet and into which a valve 12 is inserted is connected to the pipe 4.

For the purpose of potential measurement two electrodes 15 are arranged in the container 1 preferably in that third part which is adjacent to the outlet. One of the electrodes is a glass electrode which has a relatively high alkali deficiency and which is sensitive to sodium ions; the other electrode is a calomel electrode. The electrodes 15 are connected to a measuring instrument 16 which has adjustable operated contacts. The contacts are disposed in a control circuit 17 which operates the valves 2, 5, 7, 10 and 12.

In normal operation the valves 7, 10 and 12 are closed and the valves 2 and 5 are open. The crude water flows through the ion exchange material in the container 1 and enters the circuit reserved for the soft water by way of the pipe 4. When the ion exchange material in the container 1 is nearly exhausted the measuring instrument 16 indicates only a few remaining sodium ions. Thereby a control signal is delivered to the circuit 17 which closes the valves 2 and 5 and opens the valves 10, 7 and 12. Then the regenerating solution is forced out of the container 8 into the container 1 having the ion exchange material and is passed to the outlet by way of the conduit 11. When the electrodes 15 indicate that the sodium ion concentration at the outlet of the alkali exchanger corresponds to the concentration of the regenerating solution the instrument 16 delivers a further control signal to the circuit 17 which closes the valves 10 and 7, but opens valve 2. Thereby crude water flows through the container 1 and washes the ion exchange material, the washing water passing through the conduit 11 and the valve 12 to the outlet. If now a sodium ion concentration is measured by the electrodes 15 which corresponds approximately to the hardness of the crude water or which is only a little higher than the hardness of the crude water the instrument 16 delivers a further control signal to the circuit 17 which closes the valve 12 and opens the valve 5. The regeneration and washing of the ion exchange material is terminated thereby and this material is inserted again for normal operation between the crude water conduit and the soft water conduit.

In the embodiment according to the invention illustrated in FIG. 2 the lower part of the container 1 which is filled with ion exchange material 13 has a branch conduit 18, which is connected by way of a vessel 19 to a suction nozzle 20 which is inserted in the incoming water pipe 3 leading to the container 1. Blocking valves 21 and 22 are provided on either side of the vessel 19. The electrodes 15 are disposed in the vessel 19.

The embodiment illustrated in FIG. 2 differs from the embodiment illustrated in FIG. 1 only by the fact that electrodes 15 are not arranged directly in the column of ion exchange material, but that water is removed at a certain place in the ion exchange material and is then examined.

The instant at which the regenerating solution is switched off and the washing process is switched on may alternatively be slightly delayed relatively to the instant at which the measuring instrument 16 indicates the respective measuring value, in order to ensure that the ion exchange material disposed in the container below the electrodes 15 is also completely regenerated.

Other methods in which an alkali metal ion different from sodium is obtained by means of an ion exchange material may also be controlled in the described manner.

In the embodiment of the invention illustrated in FIGS. 3 to 5 a container 1 with ion exchange material 13 is connected to an incoming water pipe 3 supplying hard water 32. The ion exchange material 13 absorbs from the incoming water 32 ions causing the water hardness and delivers sodium ions in exchange. Water 35 from which the hardness has been removed leaves the container having the ion exchange material by way of the soft water pipe 4. The concentration of the sodium ions in the soft water 35 which were delivered by the ion exchange material in exchange for the ions causing the water hardness, corresponds to the hardness of the incoming water 32.

A pair of measuring electrodes 15 which consists of a glass electrode sensitive for alkali metal ions and a reference electrode, for instance calomel or platinum, is located approximately in the center of the column of ion exchange material 13 in the container 1. A second similar pair of measuring electrodes 38 is located in or at the outlet for the soft water 35 from the container 1. These two electrode pairs form high resistance measuring chains and are connected to a bridge circuit 41 by leads 39 and 40.

Experience has shown that the column of ion exchange material 13 is not charged completely and uniformly with the ions causing the water hardness, but that first the outermost layer of the column of ion exchange material 13 is charged completely with the ions causing the water hardness and delivers all exchangeable sodium ions. Thereupon the layer below same becomes exhausted so that a boundary between exhausted ion exchange material and ion exchange material which is not yet exhausted progresses in the direction of flow. As long as this boundary remains above the measuring electrode pair 15, the measuring electrode pair 15 and the measuring electrode pair 38 are located in soft water 35 from which the hardness has been removed; the two measuring electrode pairs 15 and 38 therefore will not indicate different measuring values; the difference voltage between these two measuring electrode pairs is therefore approximately equal to zero. If, however, the boundary between exhausted ion exchange material and not exhausted ion exchange material in FIG. 3 extends below the measuring electrode pair 15 hardness is no longer being removed from incoming water 32 above this boundary and the measuring electrode pair 15 measures a value corresponding to the incoming water whereas the measuring electrode pair 38 records a measuring value corresponding to soft water. In this case the measuring values of the two electrode pairs 15 and 38 differ widely. In the present embodiment of the invention the sodium ion concentration is measured, that is the concentration of the ions causing the water hardness is not measured directly, but the concentration of those ions which are delivered by the ion exchange material when it absorbs the ions causing the water hardness.

In practice the boundary between non-exhausted ion exchange material and exhausted ion exchange material is not sharply defined. This, however, does not alter the principle of the invention and the considerations related therewith. In any case it may be assumed that when the difference of the values measured by the measuring electrode pairs 15 and 38 has reached a certain value, the ion exchange material is exhausted to such an extent that any moment water from which the hardness has been insufficiently removed may enter the soft water pipe 4 and that therefore the ion exchange material must be regenerated.

When this difference voltage reaches a certain value, in the example illustrated in FIG. 5 for instance 35 mv., a control signal is caused to be emitted by an amplifier 42 and a relay stage 43 which opens and closes various valves (not indicated) so that the container 1 having the ion exchange material is washed with hard water in the reverse direction, that is the container illustrated in FIG. 1 is washed with hard water from the bottom to the top. During this reverse washing process the difference voltage drops slightly. The duration of the reverse washing process may be controlled either by a time switch or even by the difference voltage itself in such a manner that at a certain, empirically formed reduction of the difference voltage a further control signal is emitted which terminates the reverse washing process and initiates the regeneration of the ion exchange material by means of a solution of common salt. In this regeneration process the lye (regeneration solution) may be passed through the ion exchange material against the direction of flow of the operating water; however, it is alternatively possible to pass the lye through the ion exchange material in the same direction as that of the operating water current.

Also the duration of the regeneration process may be controlled either by a time switch or by the difference voltage between the two pairs of measuring electrodes. After a period determined by experience has expired, or when the difference voltage between the two pairs of measuring electrodes has attained a very small value (see FIG. 5) a control signal is produced which terminates the regeneration process and washes the ion exchange material. During this washing of the ion exchange material a short rise of the difference voltage is obtained which then drops again to nearly zero or to a very small value and indicates thereby that the plant is ready for operation again. The individual processes during washing and regenerating may be indicated by control lamps 45, 46, 47 and 48; for instance the control lamp 45 may indicate the normal operating state, the control lamp 46 the reverse wash, the control lamp 47 the purging of the ion exchange material with lye, and the control lamp 48 the washing.

The individual processes may be carried into effect by means of magnetic valves or the like.

The apparatus may have a number of relays in the relay stage 43, the relays being adjusted to various threshold values, and the individual relays may be connected to the current circuit by way of a programming disc. When the individual relays are energized they close the contacts necessary for carrying the various switching processes into effect and the magnetic valves energized thereby close the corresponding inlet and outlet pipes.

The apparatus may contain an instrument 50 for indicating the difference voltage and/or an instrument 73 for recording the course of the difference voltage.

A bridge circuit by means of which a difference voltage is amplified is discussed in detail with reference to FIG. 4.

The active electrodes of the pair of measuring electrodes are connected to the inputs 51 and 52; the reference electrodes are connected to the input 53. The electrode pairs form high resistance measuring chains. The input 51 is connected to the input 68 of the bridge circuit by way of resistors 66 and 55; the input 52 is connected to the input 69 of the bridge circuit by way of a resistor 67. A high frequency generator 44 delivers high frequency voltage to the two bridge inputs 70 and 71. The bridge arm between the terminals 69 and 70 contains an adjustable capacitor 57 and a resistor 59 connected in parallel therewith. An adjustable capacitor 56 and a resistor 58 connected in parallel therewith lies also in a bridge arm located between the bridge terminals 69 and 71. One capacitance diode 60 or 61, for instance the diode BAY 34 of the firm Intermetal, is inserted in each of the bridge arms located between the bridge terminals 71 and 68 and the bridge terminals 70 and 68. The bridge is adjusted so that the bridge terimnals 68 and 69 have the same potential also in respect of the high voltage produced by the generator 44 when no voltage difference exists between the inputs 51 and 52. If however a voltage difference exists between the input 51 and 52 the working point of the capacitance diodes 60 and 61 is displaced. Since the slope of the capacitance curve of these capacitance diodes is very high at voltages below 2 mv. it is possible to change considerably the capacitative resistance of the bridge arms containing the capacitance diodes 60 and 61, that is to unbalance the bridge considerably even with very small difference voltages. If the difference voltage has one polarity, the resistance of the bridge arms lying between the terminals 71 and 68 is for instance considerably reduced and the resistance of the bridge arms lying between the terminals 70 and 68 is considerably increased. Consequently the terminals 68 and 69 have different high frequency potentials and this potential difference is taken off a resistor 63 and delivered to the amplifier 42 by way of a coupling capacitor 65, the amplifier amplifying the voltage and delivering same to a relay stage 43. The voltage delivered to the amplifier 42 is proportional to the voltage difference between the inputs 51 and 52.

Furthermore a capacitor 54 is connected in parallel with the inputs 51 and 52. The reference electrode 53, sometimes the chassis connection is connected to the bridge terminal 69 by way of a capacitor 64, and the resistor 63, from which the high frequency voltage corresponding to the voltage difference between the inputs 51 and 52 is taken off, is isolated from the direct current source by a capacitor 62.

Apart from the described measurement of electrical difference which is suitable mainly for fully automatic lye (sodium hydroxide or potassium hydroxide) exchanger plants, such a difference measurement may be carried into effect also with simpler means without automation. In this case only a single electrode pair is required. This electrode pair may be arranged for instance in a measuring vessel which has at least two connections leading to those places of the plant at which otherwise the pairs of measuring electrodes are located. For a speedy determination of the incoming water hardness a third connection may, additionally be fitted to the vessel which makes it possible to supply hard water to the pair of measuring electrodes. This apparatus may be fitted with a simple amplifier and a measuring instrument such as is generally used for instance for pH measurement.

It is a particular advantage of the use of the above mentioned highly resistive capacitance diodes that the voltage of pairs of measuring electrodes can be measured which include glass electrodes.

What I claim is:

1. A process for softening hard water by ion exchange and for simultaneously controlling the regeneration of the ion exchange when it becomes exhausted which comprises treating the water in an ion exchanger so as to exchange alkali metal ions for the ions causing the hardness of the water, measuring the concentration of said alkali metal ions in the treated water, and initiating and regulating the flow of a regenerating solution through said ion exchanger by means of said concentration.

2. A process according to claim 1, wherein the measurement of lakali metal ion concentration also initiates and regulates the flow of a wash solution through said ion exchanger.

3. A process according to claim 1, wherein the measurement of alkali metal ion concentration is effected in the downstream portion of said ion exchanger.

4. A process according to claim 1 wherein the concentration of alkali metal ions is determined by measuring a potential specific to said alkali metal ions.

5. A process according to claim 4, wherein said measurement of potential is carried out on at least two different points in the flow of water, one of said points being within said ion exchanger, and wherein the difference of the measured potential is used to initiate and regulate the flow of a regenerating solution and a wash solution through said ion exchanger.

6. A process according to claim 4, wherein said measurement of potential is carried out with a pair of electrodes comprising a glass electrode deficient in alkali and sensitive to alkali metal ions and a calomel electrode.

7. A process according to claim 4, wherein variations in the measured potential resulting from variations in the concentration of the alkali metal ions emitted by the ion exchanger which, in turn, result from variations in the hardness of the water, are compensated for by a second measurement on the untreated water, which is also dependent upon the hardness of the water.

8. A process according to claim 7, wherein said second measurement comprises a measurement of the conductivity of the water.

9. An apparatus for softening hard water by ion exchange and for simultaneously controlling the regeneration of the ion exchanger when it becomes exhausted which comprises an ion exchanger, an ion exchange material disposed within said ion exchanger and adapted to replace the ions causing the hardness of the water with alkali metal ions, inlet means for introducing crude water to said ion exchanger containing said ion exchange material, outlet means for removing the treated water from the ion exchanger, means disposed near the outlet means for measuring the alkali metal ion concentration of the treated water leaving said ion exchanger, said measuring means comprising a calomel electrode paired with a glass electrode having a high alkali deficiency, said glass electrode being sensitive to alkali metal ions and means responsive to said potential for initiating and regulating the flow of a regenerating solution and a wash solution through the ion exchanger.

10. The apparatus of claim 9, wherein said electrodes are disposed in a conduit which communicates with the downstream portion of the ion exchanger and with a suction-nozzle disposed in the stream of untreated water.

11. Apparatus according to claim 9, in which said electrodes are disposed within the downstream portion of the ion exchanger.

12. Apparatus according to claim 11, in which a second pair of electrodes is disposed outside the ion exchanger in the stream of treated water and wherein said initiating and regulating means is responsive to the resultant potential of the two pairs of electrodes.

13. Apparatus according to claim 12, in which said second pair of electrodes comprises a glass electrode deficient in alkali and sensitive to alkali metal ions and a calomel electrode.

14. Apparatus according to claim 12, in which the two pairs of measuring electrodes are connected to a bridge circuit whereby the difference in their responses to the measurement causes a change in the resistance of at least one bridge arm.

15. Apparatus according to claim 14, in which a high frequency generator is employed as the current source for the bridge circuit and wherein capacitance diodes are inserted in the two bridge arms of the bridge section positioned between the terminals of the high frequency generator.

16. Apparatus according to claim 15, in which the bridge output is connected to a relay by way of an amplifier.

References Cited

UNITED STATES PATENTS

| | | | |
|---|---|---|---|
| 2,829,090 | 4/1958 | Eisenman et al. | 204—195 |
| 3,076,133 | 1/1963 | Holcomb. | |
| 3,208,007 | 9/1965 | Schodowski. | |
| 3,246,759 | 4/1966 | Matalon | 324—30 |
| 2,209,487 | 7/1940 | Wagner | 210—25 |
| 1,928,384 | 9/1933 | McCanna. | |
| 2,628,194 | 2/1953 | Gilwood | 210—25 |
| 2,774,732 | 12/1956 | Blight | 210—25 |
| 2,628,191 | 2/1953 | Sard | 210—25 |
| 2,711,995 | 6/1955 | Sard | 210—25 |

JOSEPH SCOVRONEK, *Primary Examiner.*

MORRIS O. WOLK, *Examiner.*

E. G. WHITBY, *Assistant Examiner.*